March 7, 1961
H. W. GRAU
2,973,673
PORTABLE DRILL ATTACHMENT
Filed Nov. 12, 1959
2 Sheets-Sheet 1
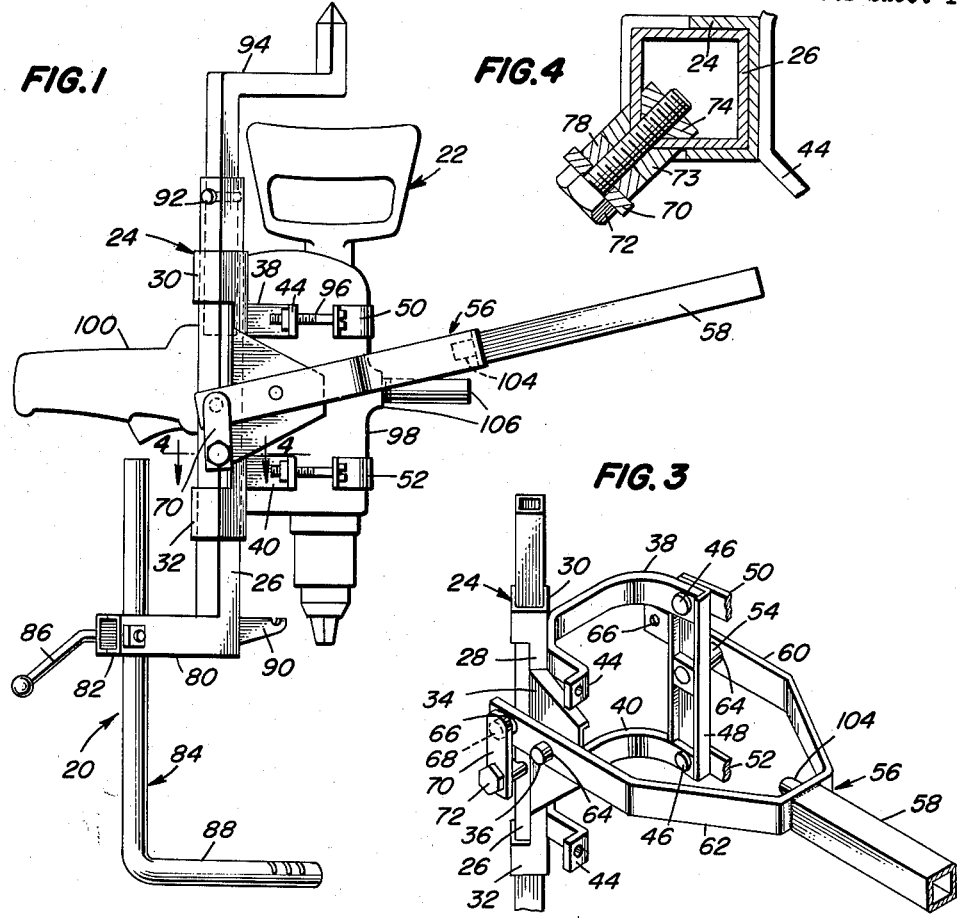
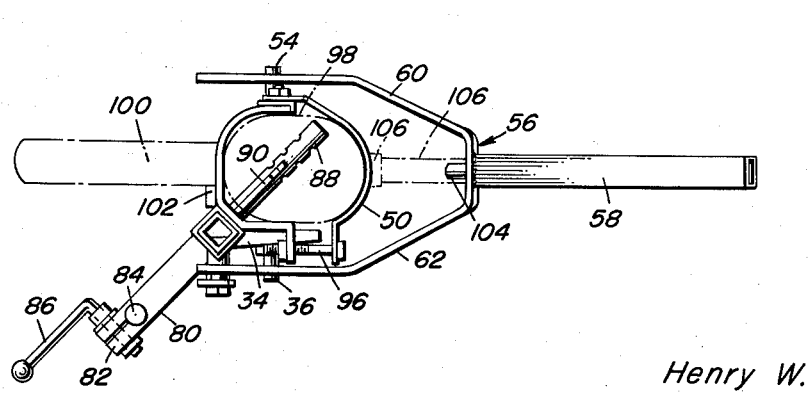
INVENTOR
Henry W. Grau
BY Walter G. Finch
ATTORNEY March 7, 1961  H. W. GRAU  2,973,673
PORTABLE DRILL ATTACHMENT
Filed Nov. 12, 1959  2 Sheets-Sheet 2

INVENTOR
Henry W. Grau
BY Walter G. Finch
ATTORNEY

United States Patent Office 2,973,673
Patented Mar. 7, 1961

2,973,673
PORTABLE DRILL ATTACHMENT
Henry W. Grau, 7925 York Road, Baltimore 4, Md.
Filed Nov. 12, 1959, Ser. No. 852,420
7 Claims. (Cl. 77—7)

This invention relates generally to metal tools, and more particularly it pertains to drill press attachments for portable electric drills.

In the operation of a portable electric drill, situations are frequently encountered where direct feed pressure is inadequate for effective drilling. Then, it is desirable to rapidly convert from a breast drill to a lever feed drill and still retain the portable convenience of the tool.

For overhead or awkward shaped work, it is of further benefit to be able to hook or chain the drill thereto, thus supporting the weight of the drill and relieving the operator from the direct backward thrust.

Experience with portable drills having feed attachments has shown that by placing a grab arm against the work at a point in line with a plane intersecting the axis of the drill spindle and the rigid handle of the drill and a short distance toward the handle is of advantage both as to leverage force and as a factor in balancing the drill. An adjusting clamp for the grab arm offside of the draw rod provides such work engaging flexibility.

The use of square cross-section tubular structure yields adequate strength with lightness and provides the non-rotating bearings for the sliding elements. A quickly reversible forked lever for pull feed or push feed, as desired, provides considerable versatility in a lightweight yet powerful drill combination.

It is, therefore, an object of this invention to provide a sturdy and versatile lever feed attachment which can be readily clamped to conventional hand electric drills without marring their casings or requiring special provisions thereon.

Another object of this invention is to provide a grab arm in a lever feed attachment for portable drills which is readily positioned to bear in a plane intersecting the axis of the drill spindle and the rigid handle of the drill and at a short distance theretoward.

Another object of this invention is to provide a slide bearing of square cross-section for lever feed portable drill attachment.

And yet another object of this invention is to provide in combination with an electric drill having a rigid handle, a pivoted, reversible feed handle which can be adapted for push or pull feeding or locked to provide a co-extensive opposite rigid handle.

These and other objects and attendant advantages of the invention will become more readily apparent and understood from the following detailed specification and accompanying drawings in which:

Fig. 1 is a side elevation of a drill provided with the improved lever feed attachment incorporating features of this invention;

Fig. 2 is a top plan view of the drill attachment of Fig. 1 with the drill shown in dot-dash lines;

Fig. 3 is a perspective view, with parts removed, of a forked lever, together with associated trunnion bolts, linkage, and bracket;

Fig. 4 is a cross-section taken along line 4—4 of Fig. 1;

Referring now to Fig. 1 of the drawings, there is shown generally a novel drill attachment 20 fitted to a conventional hand type electric drill 22. The drill attachment 20 includes a telescopic sliding arrangement having a bracket 24 mounted upon a square tubular draw rod 26.

Figure 5:
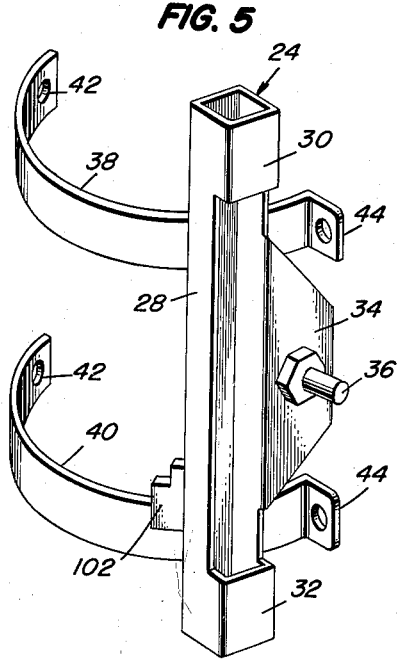
Fig. 5 is a detailed perspective view of a slidable bracket together with the upper and lower bands.
Figure 6:
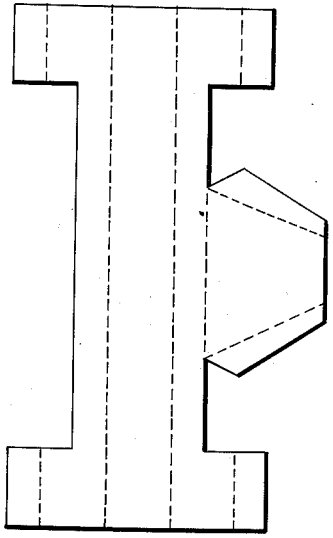
Fig. 6 is a layout pattern from which the bracket and wing of Fig. 5 are formed.

As best illustrated in Fig. 5, the bracket 24 is formed with an open central channel portion 28, and closed upper and lower slide bearings 30 and 32. A wing 34 is attached or formed at one side of the channel portion 28 of the bracket 24. In the preferred embodiment of the bracket 24, the wing 34, the channel portion 28, and the slide bearings 30 and 32 may conveniently be folded up and welded from the sheet metal pattern shown in Fig. 6.

A left trunnion bolt 36 is secured to this wing 34, as best illustrated in Figs. 3 and 5. A pair of upper and lower bands 38 and 40, respectively, are welded to the upper and lower slide bearings 30 and 32 at the back side of the bracket 24 corresponding to the channel portion 28. The bands 38 and 40 are curved and are formed of relatively stiff metallic material. These bands 38 and 40 have holes 42 punched in one end of each and, in addition, have perforated bent ears 44 formed at their other ends.

A pair of bolts or rivets 46 are positioned in the end holes 42 of the bands 38 and 40 to secure a vertical strut 48 therebetween as well as fastening one end of each of a flexible pair of upper and lower straps 50 and 52. The strut 48 is centrally provided with a right trunnion bolt 54 so placed as to be axially co-extensive with the left trunnion bolt 36.

A forked lever 46, having a handle 58 and right and left arms 60 and 62, respectively, is arranged to provide leverage about the trunnions 36 and 54 located in a pair of oppositely opposed pivot holes 64 in the arms 60 and 62.

Another pair of pivot holes 66 are drilled in the ends of the arms 60 and 62. One of these end pivot holes 66 is reserved for an application to be later described while the other is arranged to receive a pin 68 secured in a link 70. The other end of link 70 is drilled for a pivot bolt 72 which is assembled to the corner of the draw rod 26 in the manner illustrated in the sectional view of Fig. 4.

A washer 73, having a V-shaped face, is saddled upon the outer surface of the corner of draw rod 26. A tapped nut 74, having a complementary V-shape, receives the threaded end of pivot bolt 72 therewithin. An outer lock nut 78 completes this assembly and is so adjusted together with the head of the bolt 72 to provide a loose swinging fit for the link 70 therebetween.

As shown in Figs. 1 and 2, the lower end of the draw rod 26 is provided with a lateral arm 80. This lateral arm 80 is drilled and split at its end to provide a clamp 82 for a round grab arm 84. By means of a hand clamp screw 86, the clamp 82 may be tightened or loosened to adjustably position the grab arm 84 and therewith a serrated foot 88 at its lower end. It will be noted that the foot 88 is swingable as well as vertically positionable.

A notched chain arm 90 is welded in a position diametrically opposite to the lateral arm 80 at the lower end of the draw rod 26. The upper end of the draw rod 26 is provided with a removable pin 92 to hold a removable angular arm 94 which may be inserted therein, as shown in Fig. 1.

By means of a pair of threaded bolts 96, the flexible straps 50 and 52 can be drawn around the casing 98 of the drill 22 cradled in the bands 38 and 40, and secured to the ears 44 to hold the electric drill 22 tightly in a vertical position. To prevent vertical thrust from dislodging the electric drill 22, it is positioned with its handle 100 against the lower edge of the upper band 38. A lug 102 is welded to the lower band 40 adjacent the channel portion 28, as shown in Figs. 5 and 2. Bearing, as it does, against the side of the handle 100, the lug 102 effectively prevents dislocation of the electric drill 22 under drilling torque.

A pin 104 is provided between the arms 60 and 62 where they join the handle 58, as shown in Figs. 1, 2 and 3. When the electric drill 22 is provided with a threaded boss 106 in its casing 98, a threaded tube 106 may be backed out to engage with this pin 104 to rigidly fix the handle 58 coextensive with the drill handle 100 for rapid conversion to a two-armed breast drill.

With the threaded tube 106 removed, the drill attachment 20 functions as a portable drill press which may be hooked to the work by means of the adjustable grab arm 84. The notched chain arm 90 provides a means for the chain to secure the work against the force of drilling, if desired. The angular arm 94 may be used against a timber or post as a steady rest.

Furthermore, for overhead drilling or close location work, the forked lever 56 is easily reversible end-for-end by springing the arms 60 and 62 from the trunnion bolts 36 and 54 and the link pin 68. When so reversed, the end holes 66 engage these trunnion bolts 36 and 54, and one of the holes 64 becomes the pivot bearing for the link pin 68.

Figure 7:
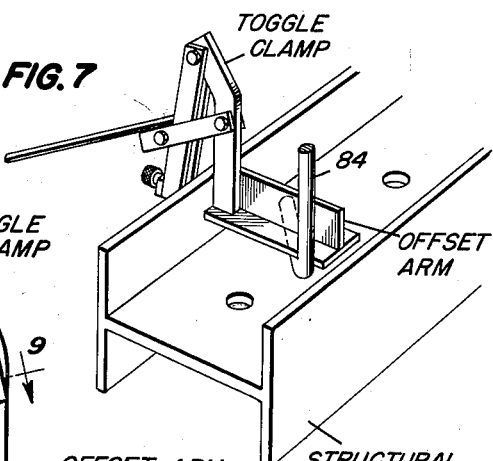
Fig. 7 is a perspective drawing illustrating the use of a toggle clamp with a grab arm.
Figure 8:
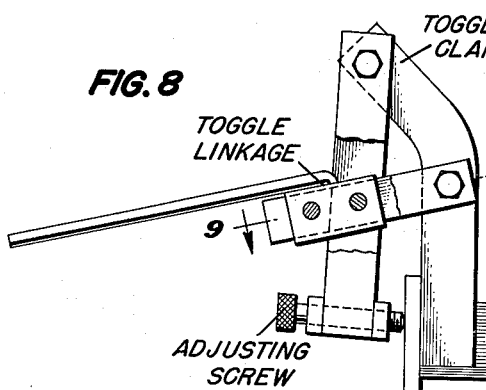
Fig. 8 is a side view of a quick release and ready positioning toggle-head offset arm for use in drilling with the improved lever feed drill attachment.
Figure 9:
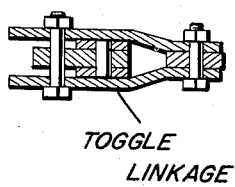
Fig. 9 is a cross-section taken along line 9—9 of Fig. 8 illustrating the toggle linkage for the clamp thereof.

In drilling with this reversed handle modification, the handle 58 is pulled from rather than pushed to the work. In overhead work, the weight of the operator thus provides the drilling thrust.

Where the location of the holes to be drilled precludes the normal use of the grab arm 84, engagement may be made to the work by means of a clamp accessory, as shown in Fig. 7. As further detailed in Figs. 8 and 9, the clamp is provided with an offset arm, an adjusting screw, and a toggle linkage to enable ready positioning on the work for more effective and convenient use of the grab arm 84.

While there has been described and illustrated herewith the preferred form of the invention, it should be understood in the light of these teachings that within the scope of the appended claims the invention may be practiced otherwise than as specifically described.

What is claimed is:

1. In combination with a portable drill having a casing, a handle rigidly secured to and projecting from one side of said casing, an attachable bracket for said casing, a handle lever pivotally connected to said bracket, a slidable draw rod connected to said handle lever, and means for locking said handle lever in a rigid position in relationship to said casing opposite said rigid handle.

2. In combination with a portable drill having a casing, an attachable bracket having a wing portion and attaching bands with a strut extending between said bands, a forked lever, pivot elements secured to said bracket, said pivot elements supporting said forked lever, a draw rod connected to said forked lever, one of said pivot elements being attached to said wing portion of said bracket, the other pivot element being attached to said strut supported by said bracket attaching bands, said pivot element being positioned on opposite sides of said drill casing.

3. In combination with a portable drill having a spindle and a casing, a handle rigidly secured to and projecting from one side of said casing, an attachable means supported by and adjacent to said casing, said attachable means including spaced bands positioned around said casing, a forked lever having arms pivotally mounted on opposite sides to said attachable means on an axis substantially at right angles to a plane coinciding with the axis of said spindle of said drill and said rigid handle, a square-sided draw rod slidably mounted on said attachable means and having slide bearings with inner surfaces to conform to the sides of said draw rod and connected to said forked lever, and a grab arm mounted on said draw rod.

4. In combination with a portable drill as recited in claim 3, and additionally means including a link for connecting said draw rod with one of said arms of said forked lever so that the pivoting of said forked lever may be made interchangeable between the pivot of said attachable means for said arms of said forked lever and said link.

5. In combination with a portable drill as recited in claim 3, wherein said draw rod has a laterally extending arm inclined away from said drill spindle, said laterally extending arm being provided with an adjustable clamp for holding said grab arm to provide both rotary and longitudinal adjustment thereof.

6. In combination with a portable drill as recited in claim 4, wherein said draw rod is tubular, a pivotal member connecting said link to said draw rod and passing through the wall of said draw rod, and an inner element and an outer element for holding said pivotal member in relationship to said draw rod.

7. In combination with a portable drill having a spindle and a casing, a handle rigidly secured to and projecting from one side of said casing, an attachable means supported by and adjacent to said casing, a forked lever having arms pivotally mounted on opposite sides to said attachable means on an axis substantially at right angles to a plane coinciding with the axis of said spindle of said drill and said rigid handle, a square-sided draw rod slidably mounted on said attachable means and having slide bearings with inner surfaces to conform to the sides of said draw rod and connected to said forked lever, and a grab arm mounted on said draw rod.

References Cited in the file of this patent

UNITED STATES PATENTS

| Re. 15,864 | Graw | June 24, 1924 |
| 2,038,422 | Decker | Apr. 21, 1936 |
| 2,477,916 | Wilhide | Aug. 2, 1949 |

FOREIGN PATENTS

| 643,869 | Great Britain | Sept. 27, 1950 |